(12) United States Patent  (10) Patent No.: US 6,471,045 B1
Harden  (45) Date of Patent: Oct. 29, 2002

(54) ROLLER AND BELT CONVEYOR SYSTEM

(75) Inventor: Brian L. Harden, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/668,710

(22) Filed: Sep. 22, 2000

Related U.S. Application Data (60) Provisional application No. 60/158,830, filed on Oct. 12, 1999.

(51) Int. Cl.$^7$ ............................................. B65G 15/10
(52) U.S. Cl. .................... 198/817; 198/835; 198/844.02
(58) Field of Search ................................ 198/817, 835, 198/615, 781.01, 781.02, 844.02

(56) References Cited

U.S. PATENT DOCUMENTS

| | | | |
|---|---|---|---|
| 1,689,201 A | * 10/1928 | Halter | 198/817 |
| 3,486,602 A | * 12/1969 | Zuercher | 198/817 |
| 3,951,255 A | 4/1976 | Shuttleworth et al. | |
| 4,053,039 A | 10/1977 | Shuttleworth | |
| 4,067,428 A | 1/1978 | Shuttleworth | |
| 4,384,642 A | 5/1983 | Gundersen | |
| 4,681,203 A | 7/1987 | Kornylak | |
| 4,969,548 A | 11/1990 | Kornylak | |
| 5,052,541 A | 10/1991 | James et al. | |
| 5,082,109 A | 1/1992 | Blondeau | |
| 5,086,906 A | 2/1992 | Ludke | |
| 5,203,446 A | * 4/1993 | Ufland | 198/844.2 |
| 5,207,313 A | 5/1993 | Gebhardt | |
| 5,404,636 A | 4/1995 | Stefansky et al. | |
| 5,670,230 A | * 9/1997 | Schlueter et al. | 198/844.2 |
| 5,996,764 A | 12/1999 | Barkley | |

* cited by examiner

Primary Examiner—Joseph E. Valenza
(74) Attorney, Agent, or Firm—Fellers, Snider, et al.

(57) ABSTRACT

A roller and belt conveyor system with several roller assemblies supporting a plurality of conveyor belt sections for conveying articles. Each conveyor belt section circumvents and is supported by at least two roller assemblies. Each roller assembly has a powered rotating shaft supporting several adjacent loose fit rollers with inner diameters greater than the outer diameter of the rotating shaft allowing slippage between the loose fit rollers and the power to rotating shaft. Each conveyor belt section circumvents at least one roller assembly that differs from the roller assemblies supporting adjacent conveyor belt sections. The length of the conveyor belt sections is $2\alpha(x+\pi r)$ where x is the distance between the rotational axes of the first and last roller assemblies supporting the conveyor belt section, r is an outer diameter radius of the loose fit roller and $\alpha$ is between about 1.00–1.05.

18 Claims, 7 Drawing Sheets

ROLLER AND BELT CONVEYOR SYSTEM

RELATED APPLICATIONS

This application claims priority to U.S. Provisional Application No. 60/158,830 filed Oct. 12, 1999.

FIELD OF THE INVENTION

The present invention relates generally to the field of conveyor devices, and more particularly, but not by way of limitation, to a roller and belt conveyor system for assembling printed circuit boards for a disc drive.

BACKGROUND

Modern hard disc drives are commonly used in a multitude of computer environments ranging from super computers through notebook computers to store large amounts of data in a form that can be made readily available to a user. Typically, a disc drive comprises one or more magnetic discs that are rotated by a spindle motor at a constant high speed. The surface of each disc serves as a data-recording surface and is divided into a series of generally concentric recording tracks radially spaced across a band between an inner diameter and an outer diameter. The data tracks extend around the disc and data is stored within the tracks on the disc surface in the form of magnetic flux transitions. The flux transitions are induced by an array of transducers otherwise commonly called read/write heads. Typically, each data track is divided into a number of data sectors that store fixed sized data blocks.

Each read/write head includes an interactive element such as a magnetic transducer, which senses the magnetic transitions on a selected data track to read the data stored on the track. Alternatively, the read/write head transmits an electrical signal that induces magnetic transitions on the selected data track to write data to the track. As is known in the art, the read/write heads are supported by rotary actuator arms and are positioned by the actuator arms over a selected data track to either read or write data. The read/write head includes a slider assembly having an air-bearing surface that causes the read/write head to fly relative to the disc surface. The air bearing is developed by load forces applied to the read/write head by a load arm interacting with air currents produced by disc rotation.

Typically, several open-centered discs and spacer rings are alternately stacked on the hub of a spindle motor, followed by the attachment of a clampring to form a disc pack. The hub, defining the core of the stack, serves to align the discs and spacer rings around a common centerline. Movement of the discs and spacer rings is typically constrained by a compressive load maintained by the clampring. The complementary actuator arms of an actuator assembly, commonly called an E-block, support the read/write heads to access the surfaces of the stacked discs of the disc pack. The read/write heads communicate electronically with a printed circuit board assembly (PCB) through read/write wires and a flex circuit attached to the E-block.

The PCB functions as an electronic interface between the magnetically stored data on the disc drive in the computer served by the disc drive. Additionally, the PCB provides electronic controls, such as read/write channels and servo circuits, for the physical operation and control of the disc drive during operation of the disc drive within the computer. The PCB monitors and controls the rotational speed of the spindle motor, the acceleration, deceleration and track following of the read/write heads, otherwise known as head positioning, by controlling the movement of the E-block. The speed, precision, reliability and data rate demanded of a modern disc drives for storage and retrieval of digital data has led to the utilization of increasingly sophisticated electronic components.

Reductions in form factor of modern disc drives has placed a premium on the availability of physical space, sometimes referred to as board real estate or real estate, for mounting components on PCBs. The scarcity of component mounting real estate has led to the incorporation of surface mount technology, as the preferred production technique for assembling PCBs used in disc drives. Surface mount technology accommodates the use of both sides of the circuit board for mounting electronic components. Additionally, surface mount technology is particularly suited for automated assembly of disc drives PCBs for two reasons. First, the physical size of surface mount components is characteristically small, making manual placement of the components on the circuit board difficult and time consuming and expensive. Second, the level of sophistication and susceptibility to mechanical and electrostatic damage of surface mount components necessitates the use of automation for the production of reliable PCBs. Collectively, the physical size of surface mount electronic components, the degree of precision required for placement of the surface mount electronic components, the production rates and the susceptibility to damage precludes the use of manual labor in the production process.

The demand for disc drives in the marketplace has grown faster than the demand for computers due to the increased presence, use and demand for Internet access. As a result, disc drive manufacturers have experienced a rapid increase in the demand for their products and are continually seeking ways to improve product throughput rates and productivity. One technique used by the industry to increase the throughput rate of PCBs is to process multiple printed wiring board as a single printed wiring assembly and separate the completed assembly into PCBs upon completion off the assembly process. A common configuration for printed wiring assemblies used by disc drives is a single printed wiring assembly made up of two printed wiring boards, also referred to as a "two-up", with each printed wiring board including a combination interface and power board edge connector. Other typical configurations of printed wiring boards for printed wiring assemblies include "four-ups", "six-ups" and "eight-ups". The number of printed wiring boards included in a printed wiring assembly depends on the physical size of the printed wiring board in relation to the overall dimensions of the printed wiring assembly the production line is capable of processing. For example, the stroke of the solder past application equipment often restricts the overall length of the printed wiring assembly and the conveyor width often restricts the overall width of the printed wiring assembly.

Another response by disc drive producers to the increased demand for disc drives has been the advances made in flexible, surface mount assembly lines. The concept behind a flexible, surface mount assembly line is the ability to intermix and reposition several types of automation equipment throughout the automated assembly line. The ability to "mix and match" automation equipment to meet the product requirements of a particular print circuit board has allowed the manufacturers to shift between various PCB configurations while minimizing line setup times. However, at times, difficulties arise when coupling various types of equipment together in the production line and, in some instances, a dwell time is needed between process steps; or a time variable process necessitates the use of specialty conveyors specifically suited for surface mount technology automated assembly production line environments.

The following are among the requirements for surface mount technology conveyors; the conveyors should convey the PCBs with a minimum amount of jostling; the conveyors should be ESD safe; and should be designed to avoid jamming, scuffing, and shingling during transport and accumulation of PCBs thereon. An example of a typical conveyor meeting these basic needs is the Slip-Torque conveyor by Shuttleworth. Construction of the Slip-Torque conveyor includes a series of parallel rotating roller shafts with each roller shaft containing several adjacent loose fit rollers. The rotating roller shafts rotate under power and the coefficient of friction between each rotating roller shaft and loose fitting rollers controls the amount of drive force transmitted to the PCBs. The product weight and roller section determines the level of drive force.

Typically between 1 and 20 percent of the weight of the PCB applied to the loose fit rollers normal to the direction of travel is sufficient to actively convey the PCB. When an opposing force equal to between 5 to 25 percent of the weight of the PCB is applied to the PCB, opposite to and parallel with the direction of travel of the PCB, the weight of the board is no longer sufficient to sustain conveyance. The loose fit rollers cease rotation, the rotating roller shafts continued to rotate internal to the loose fit rollers and the PCB remains undisturbed until the opposing force ceases to be applied.

However, instances occur during the production of PCBs when a conveyor is needed; yet conventional conveyors, including conveyors constructed with loose fit rollers mounted on rotating roller shafts, fail to provide a solution. Typical belt conveyors are inappropriate for use as an accumulating conveyor and conventional power roller conveyors are problematic from a jamming, scuffing, and shingling perspective. While the loose fit rollers/rotating roller shaft conveyors address the scuffing and shingling issues the jamming issue remains unresolved.

Jamming often occurs when the geometry of the PCBs being assembled have a board edge connector attached on a leading or trailing edge. Board edge connectors often protrude below the horizontal surface of the PCB. When a board edge connector enters a valley between two adjacent parallel roller assemblies, there can be insufficient surface area between the PCB wiring board and the conveyor. Frictional force between conventional loose fit rollers and the rotating roller shafts is insufficient to convey the PCB, resulting in jamming. Freeing production line jams requires operator intervention, exposing the PCB to both physical and electrostatic damage and decreased productivity of the production line. There exists an unmet need for an accumulating conveyor capable of transporting surface mount technology PCBs that have components protruding below the PCB, and particularly for transporting PCBs with board edge connectors attached to the leading and trailing edges.

SUMMARY OF THE INVENTION

The present invention provides a roller and belt conveyor system well suited for conveying irregularities such as printed circuit board assemblies. The roller and belt conveyor system has a power drive assembly, supported by a frame, delivering rotational power to a number of roller assemblies that have several conveyor belt sections, each conveyor belt section supported by at least two roller assemblies. The conveyor belt sections convey the items between adjacent roller assemblies and over the length of the roller and belt conveyor system.

In a preferred embodiment, each roller assembly includes a powered rotating shaft that supports the number of adjacent loose fit rollers that have inner diameters greater than the outer diameter of the rotating shaft for slippage between the loose fit rollers and the power to rotating shaft. Each conveyor belt section circumvents at least one loose fit roller of each roller assembly supporting the conveyor belt section and each conveyor belt section is supported by at least one roller assembly that differs from the roller assemblies supporting adjacent conveyor belt sections. The coefficient of friction between the rotating shaft and each loose fit roller controls the amount of driving force transmitted from the power drive assembly to the loose fit rollers while the weight of the article determines the driving force available for conveying the article. The conveyor belt section inner circumference is $2\alpha(x+\pi r)$ where x is the distance between the rotational axes of the first and last roller assemblies supporting the conveyor belt section, r is an outer diameter radius of the loose fit roller and $\alpha$ is between about 1.00–1.05. Other features and advantages of this and other embodiments will become apparent upon a review of the attached drawings and accompanying description.

DETAILED DESCRIPTION

Figure 1:
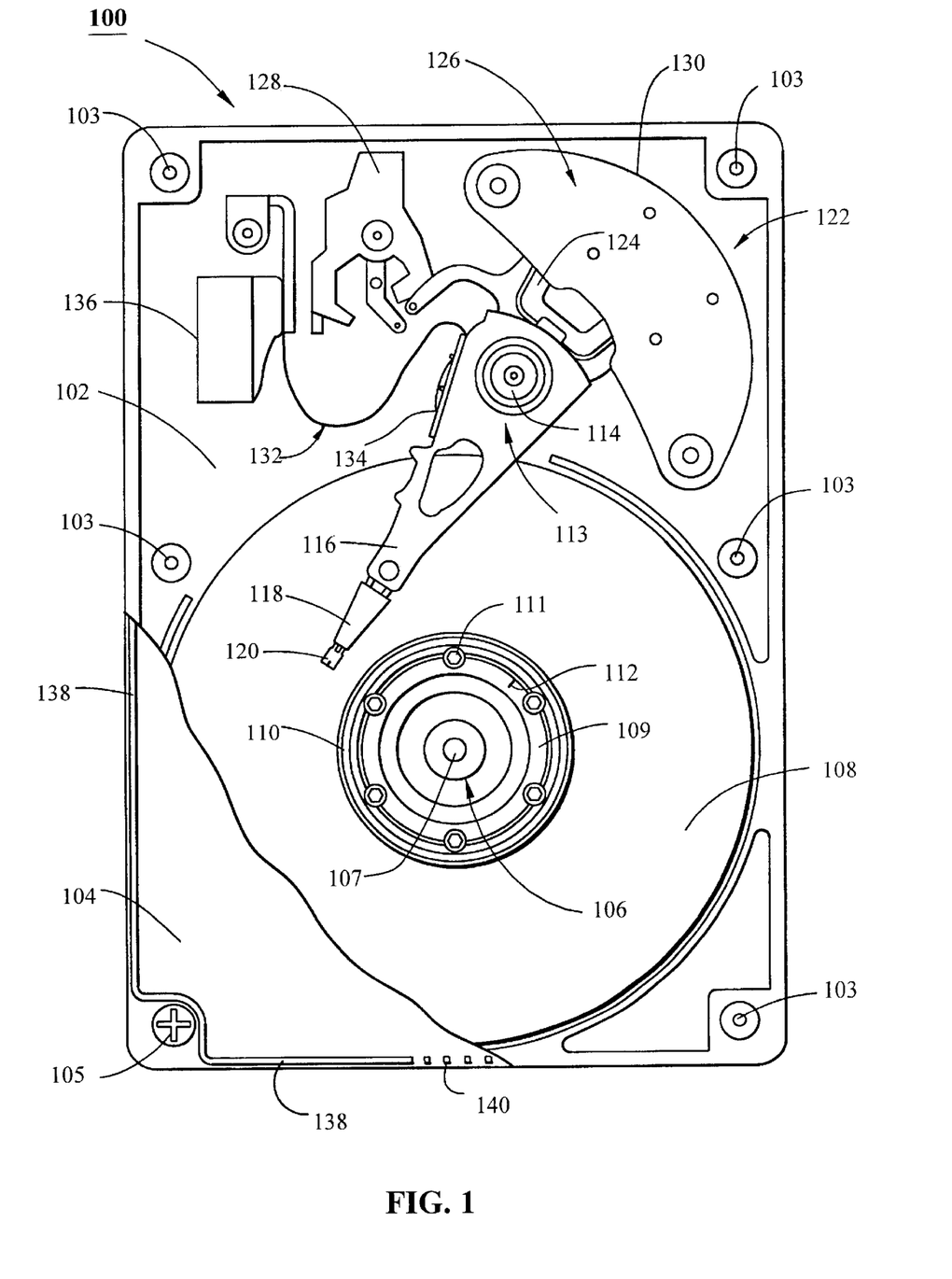
FIG. 1 is a top, partially cutaway view of a disc drive that has a printed circuit board assembly assembled using a roller on belt conveyor system constructed in accordance with the present invention.

Referring to the drawings in general, and more particularly to FIG. 1, shown therein is a top view of a disc drive 100 constructed in accordance with the present invention. The disc drive 100 includes a basedeck 102 that has several fastener receptacles 103, the basedeck 102 supporting various disc drive components, and a top cover 104 (shown in part), with several mounting apertures (not separately shown), secured to the basedeck 102 by top cover fasteners 105. The installed top cover 104 together with the basedeck 102 provides a sealed internal environment for the disc drive 100. Numerous details of construction of the disc drive 100 are not included in the following description as such are well known to those skilled in the art and are believed to be unnecessary for the purpose of describing the present invention.

Mounted to the basedeck 102 is a spindle motor 106 that has a top cover attachment aperture 107, the spindle motor supports several discs 108 mounted on a spindle motor hub 109 that are secured by a clampring 110 with clampring fasteners 111 for rotation at a constant high speed. In addition to providing support for the stacked discs 108, the spindle motor hub 109 also provides a timing mark 112 used during the assembly process to reference the angular location of a source of rotational imbalance. Adjacent the discs 108 is an actuator assembly 113 (also referred to as an "E-block") which, pivots about a cartridge bearing 114 in a rotary fashion. The actuator assembly 113 includes actuator arms 116 (only one shown) that support load arms 118. Each load arm 118 in turn supports read/write heads 120, with each of the read/write heads 120 corresponding to a surface of one of the discs 108. As mentioned, each of the discs 108 has a data recording surface divided into concentric circular data tracks, and the read/write heads 120 are positionably located over data tracks to read data from, or write data to, the tracks.

The actuator assembly 113 is controllably positioned by a voice coil motor assembly (VCM) 122, comprising an actuator coil 124 immersed in the magnetic field generated by a magnet assembly 126. A latch assembly 128 latches the actuator assembly in a predetermined park position when the disc drive 100 is turned off. A magnetically permeable flux path is provided by a steel plate 130 (also called a pole piece) is mounted above the actuator coil 124 to complete the magnetic circuit of the VCM 122.

When controlled DC current is passed through the actuator coil 124, an electromagnetic field is setup, which interacts with the magnetic circuit of the VCM 122 to cause the actuator coil 124 to move relative to the magnet assembly 126 in accordance with the well-known Lorentz relationship. As the actuator coil 124 moves, the actuator assembly 113 pivots about the cartridge bearing assembly 114, causing the heads 120 to move over the surfaces of the discs 108 thereby allowing the heads 120 to interact with the data tracks of the discs 108.

To provide the requisite electrical conduction paths between the heads 120 and disc drive read/write circuitry (not shown), read/write head wires (not separately shown) are routed on the actuator assembly 113 from the heads 120 along the load arms 118 and the actuator arms 116 to a flex circuit 132. The read/write head wires are secured to corresponding pads of a flex circuit printed circuit board (PCB) 134 of the flex circuit 132. The flex circuit 132 is connected to a flex circuit bracket 136 in a conventional manner, which in turn is connected through the basedeck 102 to a disc drive PCB (not shown) mounted to the underside of the basedeck 102. The disc drive PCB provides the disc drive read/write circuitry which, controls the operation of the heads 120, as well as other interface and control circuitry for the disc drive 100.

To maintain the sealed internal environment for the disc drive 100, a seal gasket 138 is molded on to the top cover 104. Top cover 104 has a plurality of gasket attachment apertures 140 through, which gasket material flows during the gasket molding process. A continuum of symmetrically formed gasket material is disposed on both the top and bottom surfaces of the top cover 104 and injected through the apertures 140. During the cure process, the gasket material injected into the gasket attachment apertures 140 bonds the portion of the seal gasket adjacent the top surface of the top cover 104 to the portion of the seal gasket adjacent the bottom portion of the top cover 104, thereby sealing the gasket attachment apertures 140 and forming the seal gasket 138. A gasket material found to be useful for this application is "Fluorel" by the 3M company, and more specifically, 3M "Fluorel", FE- 5621Q.

Figure 2:
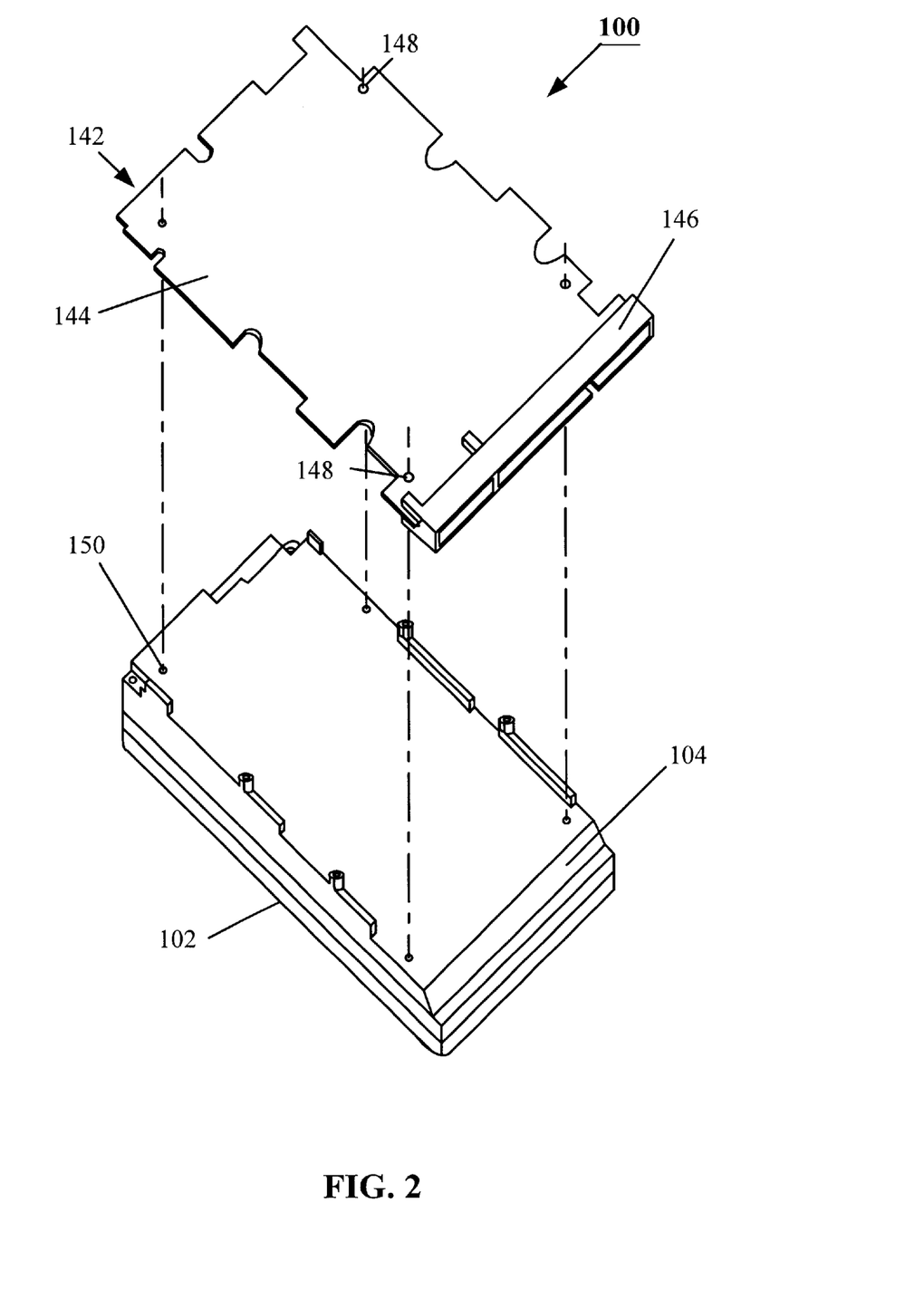
FIG. 2 is a bottom, exploded, perspective view of the disc drive of FIG. 1.

FIG. 2 shows the underside of disc drive 100 and the relationship of PCB 142 to the basedeck 104. Included in PCB 142 is a printed wiring board 144 and an edge connector 146 attached to the printed wiring board 144. The PCB 142 is attached to the basedeck 104 through the use of suitable fasteners passing through mounting apertures 148 of the PCB 142 and communicating with attachment apertures 150 of the basedeck 104. The body of the edge connector 146 has a thickness greater than the thickness of the printed wiring board 144, which creates an uneven surface profile for the PCB 142 causing difficulties in material handling of the PCB 142 during the production process of the disc drive 100.

Figure 3:
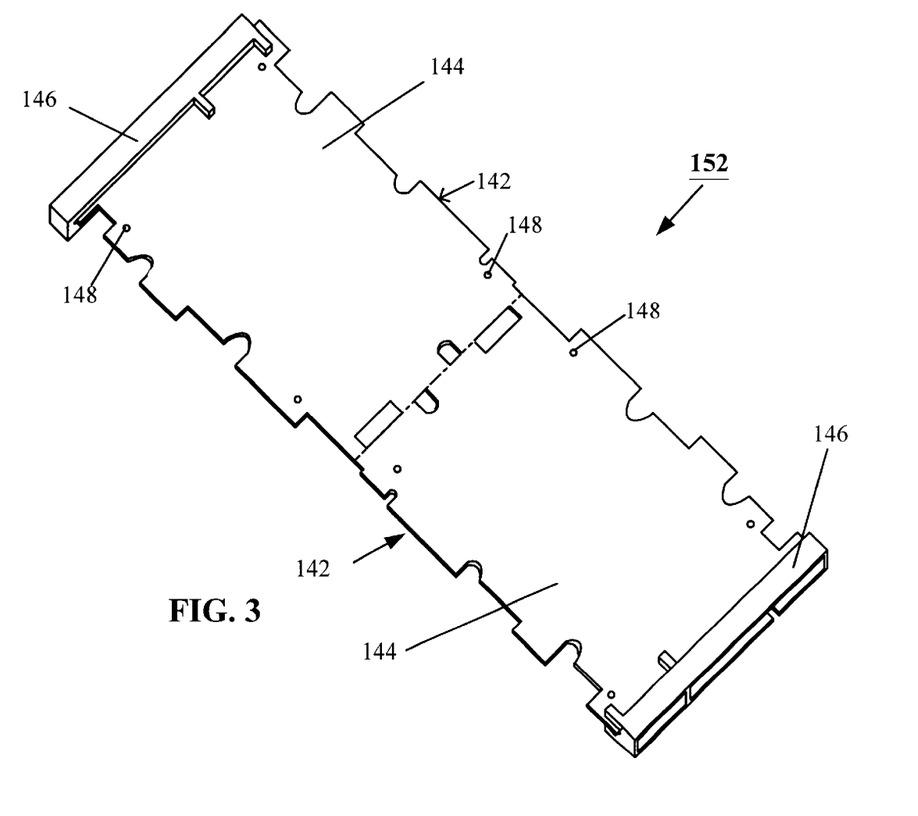
FIG. 3 is a perspective view of a two-up printed wiring assembly of the type conveyed by a roller and belt conveyor system constructed in accordance with the present invention.

FIG. 3 shows a "two-up" printed wiring assembly 152 of the type conveyed by the present invention. Each "two-up" printed wiring assembly 152 is configured with two printed wiring boards 144. The two printed wiring boards 144 are joined in the middle of the "two-up" printed wiring assembly 152, as shown by the dotted line of FIG. 3. By configuring the printed wiring assembly 152 in the "two-up" configuration, a more manageable sized workpiece is introduced into a PCB production line, overall throughput of the production line is enhanced through the elimination of spaces between printed wiring boards 144 of a "one-up" configuration. Upon completing the placement of electronic components (not shown) and passing the printed wiring assembly 152 through a conventional heat tunnel, to flow pre-applied solder paste (not shown), the first side of each PCB 142 is complete. The printed wiring assembly 152 is then flipped over, solder past (not shown) is applied to the second side and electronic components (not shown) are placed on the second side of each PCB 142. Again the printed wiring assembly 152 is passed through a conventional heat tunnel to flow the solder paste (not shown) of the second side. Upon completing assembly of the printed wiring assembly 152, the two printed wiring boards 144 are disjoined and each PCB 142 is advanced for inspection and test.

Figure 4:
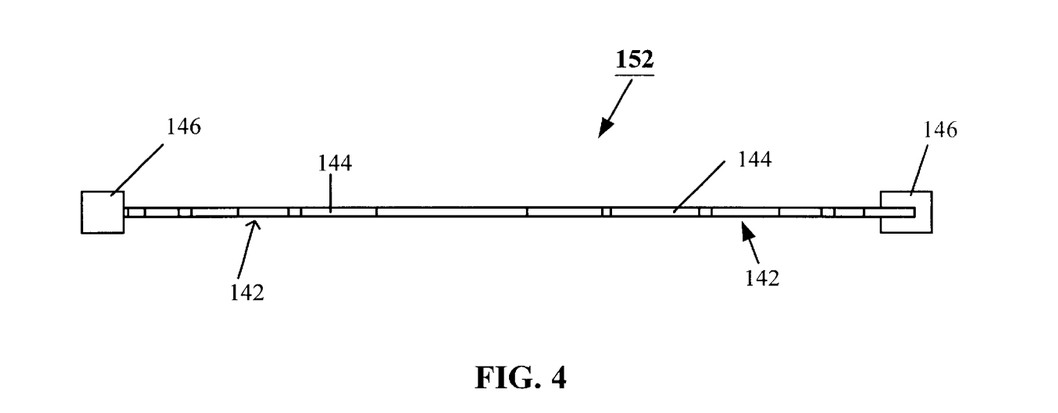
FIG. 4 is an elevational view of the two-up printed wiring assembly of FIG. 3.

FIG. 4 shows the profile of the printed wiring assembly 152, the disparity in thickness between the edge connectors 146 and the printed wiring boards 144 is of note because, that thickness disparity results in material handling problems for conventional accumulating conveyors used in PCB 142 production. A Slip-Torque conveyor by Shuttleworth is an example of a traditional conveyor that has difficulty in conveying printed wiring assemblies 152. The materials handling problem posed by printed wiring assembly 152 is jamming, caused by the protrusion of the edge connector 146 above and below the surfaces of printed wiring assembly 152. In attempting to convey the printed wiring assembly 152, the edge connectors 146 recede into a valley (not shown) created by adjacent roller assemblies.

Figure 5:
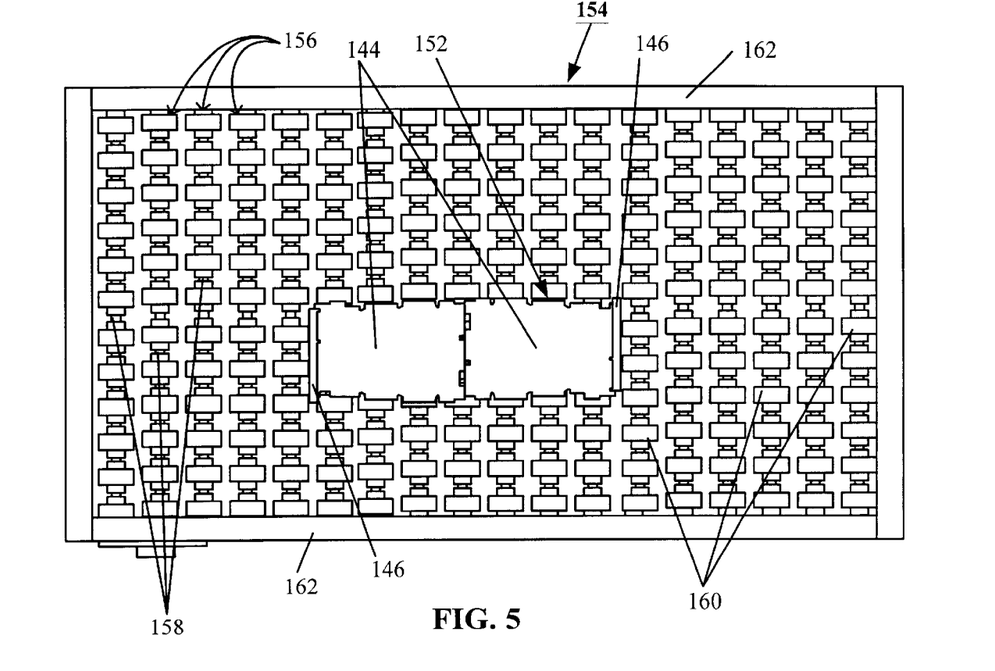
FIG. 5 is a partial plan view of a roller and belt conveyor system conveyor with roller assemblies having rotating shafts supporting loose fit rollers and plan view of the two-up printed wiring assembly of FIG. 3.

FIG. 5 shows a roller and belt conveyor system 154 absent belts (not shown) to expose the roller assemblies 156. The roller assemblies 156 of the roller and belt conveyor system 154 rotate in a common direction to convey the printed wiring assembly 152 along the length of the roller and belt conveyor system 154. Because the roller assemblies 156 are round, two adjacent roller assemblies 156 create a V-shaped space or valley (not specifically shown) between the two adjacent roller assemblies 156. Absent belts (not shown), the edge connectors 146 of the printed wiring assembly 152 tend to become lodged in the valleys (not specifically shown). The roller assembly 156 adjacent the leading edge of the edge connector 146 attempts to pull the printed wiring assembly 152 out of the valley, while the roller assembly 156 adjacent the trailing edge of the edge connector 146 attempts to drive the printed wiring assembly 152 in to the valley. The two adjacent roller assemblies abutting the edge connector 146 counter act one another resulting in the jamming of the printed wiring assembly 152. Because the edge connectors 146 protrude below the bottom surface (not separately shown) of the printed wiring boards 144, insufficient surface area of the printed wiring boards 144 are presented to the roller assemblies 156 to provide the additional driving force needed to successfully convey the printed wiring assembly 152.

Each roller assembly 156 includes a powered rotating shaft 158 supporting a several loose fit rollers 160. The roller assemblies are parallel one to another and supported by a frame 162. During operation of the roller and belt conveyor system 154, the powered rotating shafts 158 of the roller assemblies 156 are under continuous rotation. When sufficient force is applied normal to the loose fit rollers 160, the loose fit rollers 160 make firm contact with the powered rotating shaft 158. With sufficient force applied to the loose fit rollers, a frictional force develops between the rollers 160 and the powered rotating shafts 158 to transfer the drive force from the powered rotating shaft 158 to the loose fit rollers 160. The loose fit rollers 160 rotate in unison with powered rotating shafts 158 to transfer the rotational motion of the loose fit rollers 160 into linear motion of the printed wiring assembly 152. Due to the loose fit between the loose fit rollers 160 and the powered rotating shaft 158, the coefficient of friction between the loose fit rollers 160 and the powered rotating shafts 158 controls the amount of driving force transmitted from a powered drive assembly 164 (of FIG. 6) to each loose fit roller 160.

Figure 6:
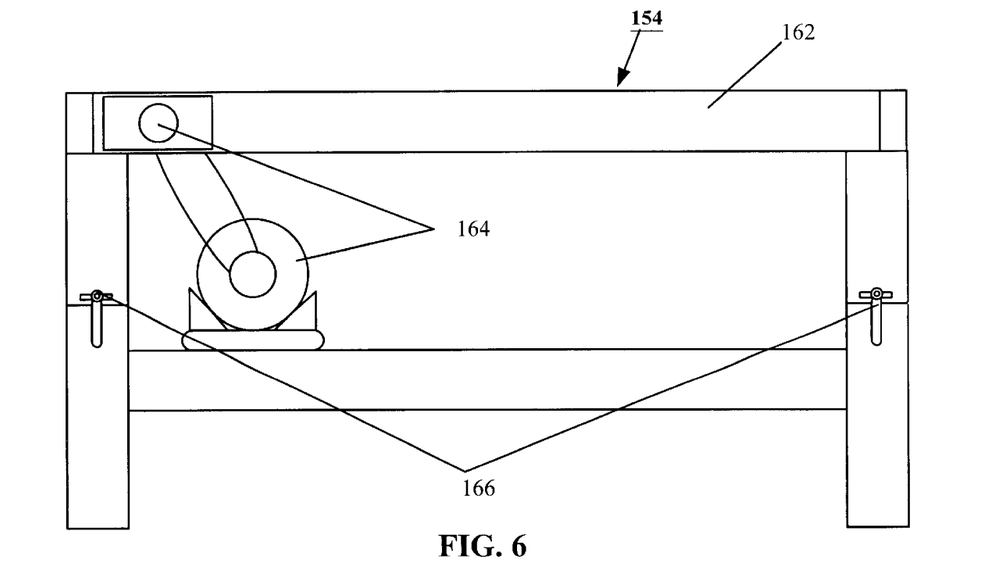
FIG. 6 is an elevational view of the roller and belt conveyor system of FIG. 5.

FIG. 6 shows the power drive assembly 164 supported by the frame 162, the power drive assembly 164 supplies rotational driving force needed to convey the printed wiring assembly 152 along the roller and belt conveyor system 154 by driving the powered drive shafts 158. The power drive assembly 164 transfers drive power to the powered rotating shafts 158 used in conveying the printed wiring assembly 152. Also shown in FIG. 6 are two of four height adjustments 166 used to position the roller and belt conveyor system 154 consistent with the operational environment of the roller and belt conveyor system 154.

Figure 7:
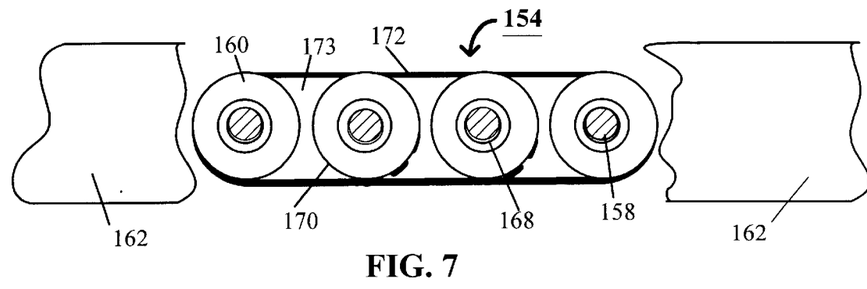
FIG. 7 is a partial cutaway, elevational view of a first embodiment of the roller and belt conveyor system of FIG. 6.

FIG. 7 shows an inner diameter 168 and in outer diameter surface 170 of the loose fit rollers 160, the inner diameter 168 is greater than the diameter of the powered drive shafts 158. The clearance between the loose fit rollers 160 and the powered drive shafts 158 is substantially ten thousands of an inch, providing a nominal clearance of five thousands of an inch. The difference in diameter between the powered drive shafts 158 and the loose fit rollers 160 assures the loose fit rollers 160 discontinue rotation when a force is applied opposite and tangent to the direction of flow of the printed wiring assembly 152. When the force opposite and tangent to the direction of flow of the printed wiring assembly 152 exceeds the coefficient of friction between the powered rotating shafts 158 and the loose fit rollers 160, the loose fit rollers 160 and the printed wiring assembly 152 stop. By discontinuing the rotation of the loose fit rollers 160 the roller and belt conveyor system 154 functions as an accumulating conveyor, allowing multiple printed wiring assemblies 152 to accumulate on the roller and belt conveyor system 154 while avoiding scuffing, shingling and jamming of the printed wiring assemblies 152 during the production operation.

FIG. 7 also shows a first embodiment of a conveyor belt section 172 supported by the loose fit rollers 160. The number of roller assemblies 156 each conveyor belt section 172 circumvents determines the overall length of each conveyor belt section 172. Each conveyor belt section 172 circumvents at least two roller assemblies 156 and is supported by at least one loose fit roller 160 of each roller assembly 158 supporting the conveyor belt section 172. Additionally, each conveyor belt section 172 is supported by and circumvents at least one roller assembly 158 that differs from the roller assemblies circumvented by and supporting any adjacent conveyor belt sections 172. This element of the invention assures discontinuity of a valley 173 created between adjacent roller assemblies 156.

In addition to showing the conveyor section 172 circumventing four roller assemblies 158, the dashed lines of FIG. 7 show configurations of conveyor belt section 172 capable of spanning two or three roller assemblies 158. The minimum number of roller assemblies spanned by conveyor belt section 172 is two. The function of the conveyor belt section 172 is to provide a moving bridge between adjacent roller assemblies 156, preventing the edge connectors 146 of printed wiring assembly 152 from dropping into the valleys 173 while being conveyed along the roller and belt conveyor system 154. The maximum number of roller assemblies 158 spanned by conveyor belt section 172 is the maximum number of roller assemblies 158. However, by circumventing all available roller assemblies 158 of the roller and belt conveyor system 154, the ability of the roller and belt conveyor system 154 to accumulate printed wiring assemblies 152 during production operations would be lost. To maximize the quantity of printed wiring assemblies 152 the roller and belt conveyor system 154 is capable of handling, the maximum number of conveyor belt sections 172 should be used, i.e., each belt section 152 should circumvent no more than two adjacent roller assemblies 156.

The conveyor belt section 172 is shown to be recessed into each roller 160 on the top portion of each roller 160 and protruding beyond the outer diameter surface 170 of each roller 160 at the bottom portion of each roller 160. In a first embodiment of the present invention, each roller 160 has a channel (shown in detail and to be discussed in FIG. 13) allowing each conveyor belt section 172 to nest within the channel. The top surface of each conveyor belt section 172 is in the same plane as the top surface of each roller 160. The overall length of each conveyor belt section 172 is selected to assure the accumulating features of the roller and belt conveyor system 154 are unencumbered.

Figure 8:
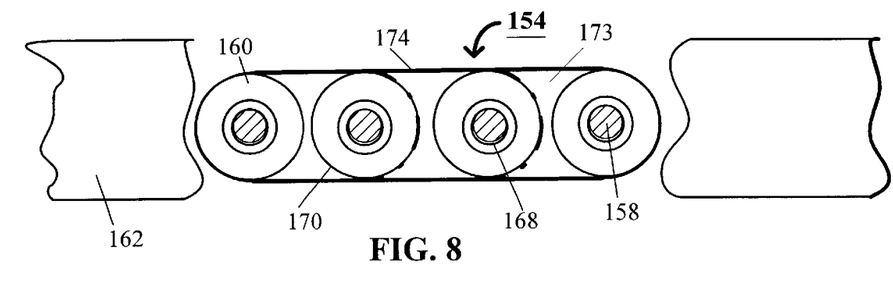
FIG. 8 is a partial cutaway, elevational view of a second embodiment of the roller and belt conveyor system of FIG. 6.

FIG. 8 shows a second embodiment of the present invention, a conveyor belt section 174. The second embodiment of the present invention provides the conveyor belt section 174 that circumvent the roller assemblies 158 and maintains contact with the outer diameter surface 170 only, of each roller 160. The width of each dealt section 174 spans at least the width of one roller 160 and more rollers 160 may be spanned as required (shown in detail and to be discussed in FIG. 12). The maximum number of rollers 160 spanned by the width of the conveyor belt section 174 is the maximum number of rollers 160 supported by each powered drive shafts 158 of the parallel roller assemblies 158. However, by spanning the width all of all available rollers 160 along adjacent roller assemblies 156 the ability of the conveyor belt sections 174 to bridge the valley 173 between adjacent roller assemblies 156 is rendered inoperative and the advantages of the present invention is lost. The width of the conveyor section 174 is a function of the material selected, as the material selected bears directly on the ability of the conveyor belt section 174 to track during operation of the roller and belt conveyor system 154 (the material selected may be from any conventional ESD safe conveyor belt material).

Figure 9:
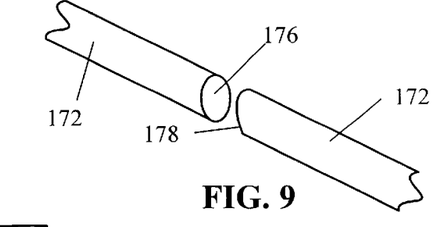
FIG. 9 is a partial cutaway, perspective view of a first embodiment of a conveyor belt section of the roller and belt conveyor system of FIG. 7.

Shown by FIG. 9 is a portion of conveyor belt section 172 with a first cut end 176 in a second cut end 178. In a first embodiment the conveyor belt section 172 material selected is an ESD safe belt material having a circular cross-sectional configuration. Each conveyor belt section 172 is cut to length. The first cut end 176 is joined to the second cut in 178 by suitable adhesive to form the conveyor belt section 172. When affixing each conveyor belt section 172 to the roller and belt conveyor system 154, the conveyor belt sections 172 are threaded between appropriate roller assemblies 156. Then, the first cut end 176 in a second cut end 178 are brought together and joined by a suitable adhesive.

Figure 10:
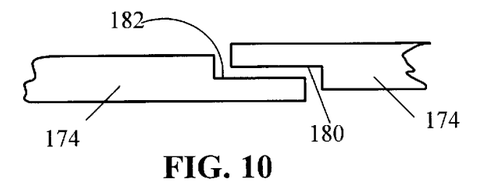
FIG. 10 is a partial cutaway, elevational view of a second embodiment of a conveyor belt section of the roller and belt conveyor system of FIG. 8.

FIG. 10 shows the second embodiment of conveyor belt section 174 with a first adhesive support member 180 and a second adhesive support member 182. The adhesive support members 180 and 182 provide a surface for applying an appropriate adhesive to join the adhesive support members 180 and 182 via an overlap of adhesive support members 180 and 182 without increasing the overall thickness of the conveyor belt section 174 at the adhesive joint. The conveyor belt section 174 is formed to length, with the overall length of the conveyor belt section 174 determined by taking into account the overlap of the first adhesive support member 180 and the second adhesive support member 182. When affixing each conveyor belt section 174 to the roller and belt conveyor system 154, the conveyor belt sections 174 are threaded between appropriate roller assemblies 156. Then, the first adhesive support member 180 and the second adhesive support member 182 are brought together and joined by a suitable adhesive. Alternatively, conveyor belt section 172 may be substituted for conveyor belt section 174 shown by FIG. 10, wherein the adhesive support members 180 and 182 provide a surface for applying an appropriate adhesive to join the adhesive support members 180 and 182 via an overlap of adhesive support members 180 and 182 without increasing the overall thickness of the conveyor belt section 172 at the adhesive joint.

Figure 11:
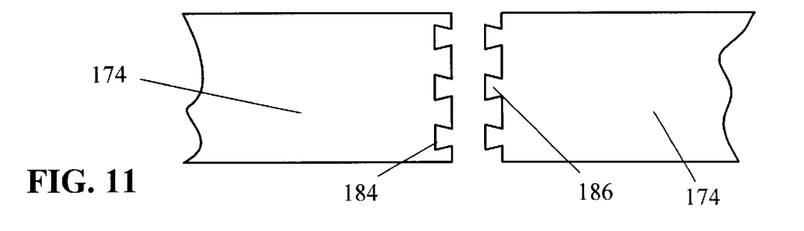
FIG. 11 is a partial cutaway, plan view of a first embodiment of a conveyor belt section of the roller and belt conveyor system of FIG. 7 or 8.

Shown by FIG. 11 the conveyor belt section 174 has a dovetailed female locking member 184 and a dovetailed male locking member 186. In forming each conveyor belt section 174 the female locking member 184 interlocks with the male locking member 186. Typically, a small amount of suitable adhesive is applied along the edge of either the female locking member 184 or the male locking member 186. The method of installing the conveyor belt section 174 with the dovetailed inter-locking members 184 and 186 follows the installation process discussed above under FIG. 10.

The conveyor belt section 174 is formed to length, the overall length of the conveyor belt section 174 is determined by taking into account the presence of the male locking member 186 and the female locking member 184. The overall length of conveyor belt section 174 includes, within it, both locking members 184 and 186, no additional provision for the presence of locking members 184 and 186 is needed. The dovetailed pattern is nothing more than a pattern cut across the material with the gaps of the female locking member 184 being filled with the material of the male locking member 186.

It should be noted that the dovetailed female locking member 184 and that dovetailed male locking member 186 configuration is also applicable to conveyor belt section 172. With the knife blade selected to cut conveyor belt section 172 material shaped to form a dovetail, the resulting cut ends 176 and 178 will be in the shape of the female locking member 184 and the male locking member 186 respectively. An advantage of cutting conveyor belt section 172 with a dovetailed configured knife blade is, the increase surface area gained for applying suitable adhesive, resulting in a stronger joint between cut ends 176 and 178.

Figure 12:
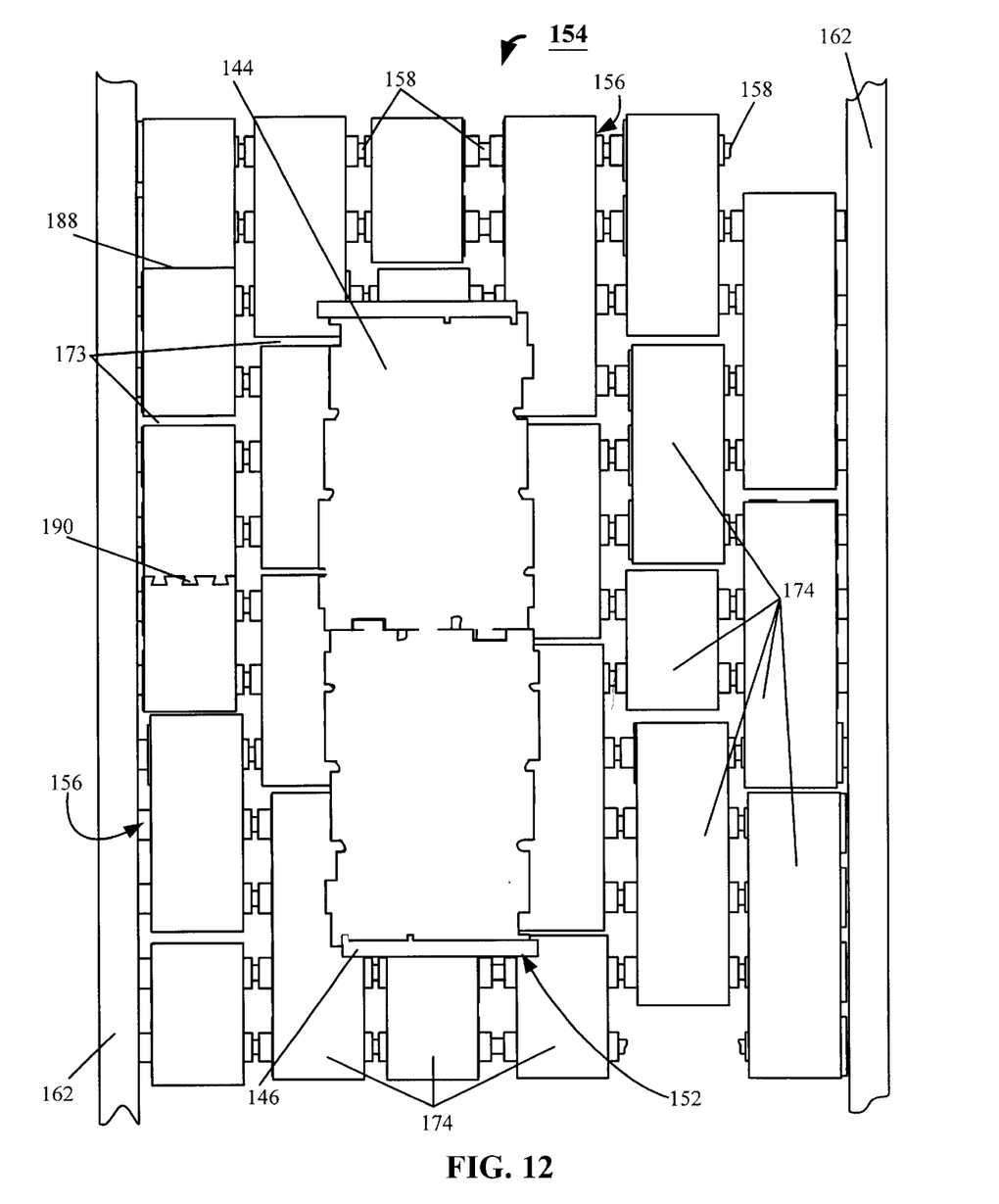
FIG. 12 is a partial cutaway, plan view of the first embodiment of the roller and belt conveyor system of FIG. 7.

FIG. 12 shows several conveyor belt sections 174, including one showing an adhesive member seam 188 and another showing a male to female junction seam 190. The formula for calculating the overall length of a conveyor belt section 174 constructed from suitable ESD safe conveyor belt material and formed to have both the first adhesive support member 180 and the second adhesive support member 182 is $[2\alpha(x+\pi r)+(fm)]$. X is the distance between the rotational axes of the first and last roller assemblies 156 circumvented by and supporting the conveyor belt section 174, r is an outer diameter radius of the loose fit roller 160, fm is the length of the first adhesive support member 180 and $\alpha$ is between about 1.00–1.05. The formula for calculating the overall length of suitable ESD safe material used to construct conveyor belt section 174, including the female locking member 184 and male locking member 186 is $[2\alpha(x+\pi r)]$. X is the distance between the rotational axes of the first and last roller assemblies 156 circumvented by and supporting the conveyor belt section 174, r is an outer diameter radius of the loose fit roller 160 and $\alpha$ is between about 1.00–1.05.

The inclusion of $\alpha$ between about 1.00–1.05 provides the ability of belt sections 174 to bridge the valley 173 between adjacent roller assemblies 156, thereby preventing edge connector 146 from entering the valley 173, while retaining the accumulation capabilities of the roller and belt conveyor system 154 and allowing the weight of the printed wiring assembly 152 to press the rollers 160 against the powered rotating shafts 158. In addition to the coefficient of friction between the powered rotating shaft 158 and each loose fit roller 160 controlling the amount of driving force transmitted from the power drive assembly 164 to each loose fit roller 160, the weight and the surface area contact between the printed wiring assembly 152 and the conveyor belt sections 174 determines the driving force available for conveying the printed wiring assembly 164 over the length of the roller and belt conveyor system 154.

To illustrate the ability of the invention to adapt to multiple environments and to illustrate that the invention may be practiced by intermixing multiple lengths of conveyor belt sections 174, conveyor belt sections 174 are shown by FIG. 12 to cover different quantities of roller assemblies 156 (shown are examples of two, three and four roller assemblies 156). FIG. 12 further shows that the discontinuity of the valley 173, created by adjacent roller assemblies 156 across the width of the roller and belt conveyor system 154, is achieved by staggering the belt sections 174. Each belt section 174 circumvents at least one roller assembly 156 different than the roller assemblies 156 supporting the belt sections 174 adjacent any given belt section 174.

Figure 13:
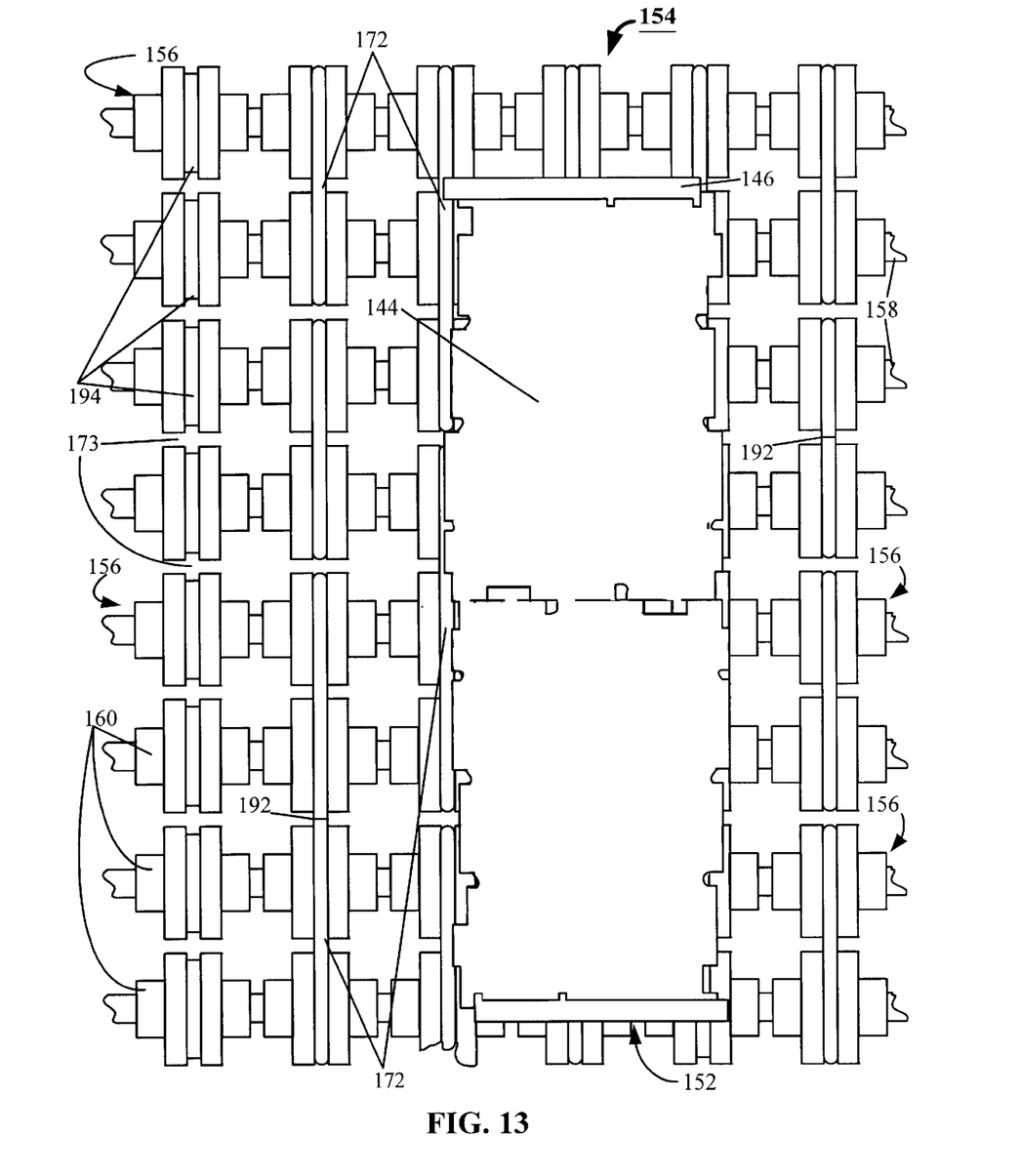
FIG. 13 is a partial cutaway, plan view of the second embodiment of the roller and belt conveyor system of FIG. 8.

FIG. 13 shows conveyor belt sections 172 to be joined at an adhesive mating joint 192 and rollers 160 having recessed surfaces 194. The recessed surfaces 194 in the rollers 160 form channels (not separately shown) that nest the conveyor belt sections 172. The configuration of the roller and belt conveyor system 154 shown by FIG. 13 is a second embodiment of the present invention. FIG. 13, taken in conjunction with FIG. 7, provides a good perspective to note the differences between the first embodiment, typified by FIG. 12, and the second embodiment, typified by FIG. 13. The length of the conveyor belt sections 172 are determined by the formula $[2\alpha(x+\pi r_2)]$. Where x is the distance between the rotational axes of the first and last roller assemblies 156 circumvented by and supporting the conveyor belt section 174, $r_2$ is a diameter radius of the recessed surface 194 of the loose fit roller 160 and $\alpha$ is between about 1.00–1.05. The remaining functions and features of conveyor belt section 172 remain the same as those of conveyor belt section 174 discussed above under FIG. 12.

The present invention provides a roller and belt conveyor system such as (such as 154) with a frame (such as 162) supporting a power drive assembly (such as 164) delivering rotational power to a plurality of roller assemblies (such as 156) for conveying a printed wiring assembly (such as 152) over the length of the roller and belt conveyor system and a plurality of conveyor belts (such as 172) supported by at least two of the roller assemblies conveying the printed wiring assembly between adjacent roller assemblies.

It is clear that the present invention is well adapted to attain the ends and advantages mentioned as well as those inherent therein. While a presently preferred embodiment of the invention has been described for purposes of the disclosure, it will be understood that numerous changes can be made which will readily suggest themselves to those skilled in the art. Such changes are encompassed within the spirit of the invention disclosed and as defined in the appended claims.

What is claimed is:

1. A roller and belt conveyor system for conveying an article comprising:
   a frame;
   a power drive assembly supported by the frame delivering rotational power to a plurality of roller assemblies supported by the frame, each roller assembly having a powered rotating shaft supporting a plurality of adjacent rollers wherein each roller supported by the powered rotating shaft is a loose fit roller with an inner diameter greater than the outer diameter of the powered rotating shaft allowing slippage between the loose fit rollers and the powered rotating shaft, the roller assemblies conveying the article over the length of the roller and belt conveyor system; and
   a plurality of conveyor belt sections, each conveyor belt section supported by at least one loose fit roller of at least two of the roller assemblies, each conveyor belt section supporting the article between adjacent roller assemblies.

2. The roller and belt conveyor system of claim 1, in which the plurality of conveyor belt sections are of varying lengths and wherein each conveyor belt section circumventing at least one loose fit roller of each roller assembly circumvented by the conveyor belt section, each conveyor belt section circumventing at least two adjacent roller assemblies, and further in which each conveyor belt section is supported by at least one roller assembly that differs from the roller assemblies supporting adjacent conveyor belt sections.

3. The roller and belt conveyor system of claim 2 wherein each conveyor belt section has a length sufficient to effect selected slippage between the loose fit rollers and the powered rotating shaft for each loose fit roller supporting the conveyor belt section when the conveyor belt section is mounted on the roller and belt conveyor system.

4. The roller and belt conveyor system of claim 3 wherein the coefficient of friction between the powered rotating shaft and each loose fit roller controls the amount of driving force transmitted from the power drive assembly to each loose fit roller, the weight of the article and the surface area contact between the article and the conveyor belt sections determines the driving force available for conveying the article.

5. The roller and belt conveyor system of claim 4 wherein the conveyor belt sections are staggered conveyor belt sections and in which the staggered conveyor belt sections contacting the article slip so that articles conveyed by the roller and belt conveyor are prevented from scuffing, shingling and jamming while accumulating on the roller and belt conveyor system, and wherein each conveyor belt section comprises formed to length belt material having a first end communicating with a second end.

6. The roller and belt conveyor system of claim 2 wherein each loose fit roller further having a recessed surface forming a channel, the channel nesting the conveyor belt section.

7. The roller and belt conveyor system of claim 6 wherein each conveyor belt section has an inner length sufficient to effect slippage between the loose fit rollers and the powered rotating shaft for each loose fit roller supporting the conveyor belt section when the conveyor belt section is nested in the channel and mounted on the roller and belt conveyor system.

8. A roller and belt conveyor system for conveying an article comprising:
   a frame;
   a power drive assembly supported by the frame delivering rotational power to a plurality of roller assemblies supported by the frame, each roller assembly of the plurality of roller assemblies having a powered rotating shaft supporting a plurality of adjacent loose fit rollers, each loose fit roller having inner diameters greater than the outer diameter of the rotating shaft allowing slippage between the loose fit rollers and the powered rotating shaft, each loose fit roller further having a recessed surface forming a channel, the roller assemblies conveying the article over the length of the roller and belt conveyor system; and
   a plurality of staggered conveyor belt sections, each conveyor belt section supported by the recessed surface of one of the plurality of loose fit rollers of each of at least two of the plurality of roller assemblies, each conveyor belt section circumventing at least two adjacent roller assemblies, each conveyor belt section supported by at least one roller assembly that differs from the roller assemblies supporting adjacent conveyor belt sections, and in which each conveyor belt section is continuous with an inner perimeter determined by an equation $2\alpha(x+\pi r_2)$ where x is the distance between the rotational axes of a first of the at least two roller assemblies and the rotational axes of a last of the at least two roller assemblies supporting the conveyor belt section, $r_2$ is a radius of the recessed surface of the loose fit roller and $\alpha$ is between about 1.00–1.05, and further in which the coefficient of friction between the powered rotating shaft and each loose fit roller controls the amount of driving force transmitted from the power drive assembly to each loose fit roller, the weight of the article and the surface area contact between the article and the conveyor belt sections determines the driving force available for conveying the article.

9. The roller and belt conveyor system of claim 8 wherein the conveyor belt sections contacting the article slip so that conveyed articles are prevented from scuffing, shingling and jamming while accumulating on the roller and belt conveyor system, and wherein each conveyor belt section comprises formed to length belt material having a first end communicating with a second end.

10. A conveyor system for conveying an article comprising:

a frame;

a plurality of powered rotating shafts supported by the frame transferring rotational power into linear motion for conveyance of an article;

a plurality of adjacent rollers slidingly supported by the plurality of powered rotating shafts, each roller supported by the powered rotating shaft is a loose fit rollers, the plurality of loose fit rollers cooperating with the plurality of powered rotating shafts to form a plurality of adjacent roller assemblies; and a means for supporting the article between adjacent roller assemblies.

11. The conveyor system of claim 10, in which each of the plurality of loose fit rollers having a recessed surface forming a channel, and in which the means for supporting the article between adjacent roller assemblies comprises a conveyor belt section circumventing at least two of the plurality of adjacent roller assemblies while nesting in the channel and being supported by the recessed surface of each loose fit roller communicating with the conveyor belt section, the conveyor belt section having a first adhesive support member overlapping a second adhesive support member, and further in which the conveyor belt section is continuous with an inner perimeter sufficient to effect slippage between the loose fit rollers and the powered rotating shaft for each loose fit roller supporting the conveyor belt section when the conveyor belt section is nested in the channel and mounted on the conveyor system.

12. The conveyor system of claim 10, in which the means for supporting the article between adjacent roller assemblies comprises a conveyor belt section circumventing at least two of the plurality of adjacent roller assemblies while being supported by the surface of each loose fit roller communicating with the conveyor belt section, the conveyor belt section comprises a dovetailed female locking member interlocking with a male dovetailed male locking member, and further in which the conveyor belt section is continuous with an inner perimeter sufficient to maintain slippage between the loose fit rollers and the powered rotating shaft for each loose fit roller supporting the conveyor belt section when the conveyor belt section is mounted on the conveyor system.

13. The conveyor system of claim 11 wherein the coefficient of friction between the powered rotating shaft and each loose fit roller controls the amount of driving force transmitted from the power drive assembly to each loose fit roller, the weight of the article and the surface area contact between the article and the conveyor belt sections determines the driving force available for conveying the article.

14. The conveyor system of claim 13 wherein the conveyor belt sections contacting the article slip so that the articles are prevented from scuffing, shingling and jamming while accumulating on the conveyor system.

15. The conveyor system of claim 10, in which each of the plurality of loose fit rollers having a recessed surface, and in which the means for supporting the article between adjacent roller assemblies comprises a conveyor belt section circumventing at least two of the plurality of adjacent roller assemblies while being supported by the recessed surface of each loose fit roller communicating with the conveyor belt section, wherein each conveyor belt section comprises a length of formed belt material having a first adhesive support member on a first end, the length of the formed belt material determined by an equation $[2\alpha(x+\pi r_2)+(fm)]$ where x is the distance between the rotational axes of a first of the at least two roller assemblies and a last of the at least two roller assemblies supporting the conveyor belt section, $r_2$ is a radius of the recessed surface of the loose fit roller, fm is the length of the first adhesive support member on the first end and $\alpha$ is between about 1.00–1.05, and further in which the coefficient of friction between the powered rotating shaft and each loose fit roller controls the amount of driving force transmitted from the power drive assembly to each loose fit roller, the weight of the article and the surface area contact between the article and the conveyor belt sections determines the driving force available for conveying the article, and further still in which the conveyor belt sections contacting the article slip so that the articles are prevented from scuffing, shingling and jamming while accumulating on the conveyor system.

16. The conveyor system of claim 10, in which each of the plurality of loose fit rollers having a recessed surface, and in which the means for supporting the article between adjacent roller assemblies comprises a conveyor belt section circumventing at least two of the plurality of adjacent roller assemblies while being supported by the recessed surface of each loose fit roller communicating with the conveyor belt section, wherein each conveyor belt section comprises a length of cut belt material having a first cut end, a second cut end and an adhesive joining the first cut end to the second cut end, wherein each conveyor belt section has an inner length sufficient to effect slippage between the loose fit rollers and the powered rotating shaft for each loose fit roller supporting the conveyor belt section when the conveyor belt section is nested in the channel and mounted on the roller and belt conveyor system, and further in which the coefficient of friction between the powered rotating shaft and each loose fit roller controls the amount of driving force transmitted from the power drive assembly to each loose fit roller, the weight of the article and the surface area contact between the article and the conveyor belt sections determines the driving force available for conveying the article, and further still in which the conveyor belt sections contacting the article slip so that the articles are prevented from scuffing, shingling and jamming while accumulating on the conveyor system.

17. The conveyor system of claim 10 wherein the coefficient of friction between the powered rotating shaft and each loose fit roller controls the amount of driving force transmitted from the power drive assembly to each loose fit roller, the weight of the article and the surface area contact between the article and the conveyor belt sections determines the driving force available for conveying the article.

18. The conveyor system of claim 17 wherein the conveyor belt sections contacting the article slip so that the articles are prevented from scuffing, shingling and jamming while accumulating on the conveyor system.

* * * * *